Aug. 8, 1961 H. J. KLOTZ 2,995,241

RECORD CARD COLLATOR

Filed Dec. 31, 1956 4 Sheets-Sheet 1

INVENTOR
HERMAN J. KLOTZ

BY J. Janin Jr.
ATTORNEY 2,995,241
RECORD CARD COLLATOR

Herman J. Klotz, Endicott, N.Y., assignor to International Business Machines Corporation, New York, N.Y., a corporation of New York Filed Dec. 31, 1956, Ser. No. 631,855
3 Claims. (Cl. 209—110)

This invention relates in general to record card collators, and in particular to the record card transport and handling mechanism thereof.

As is recognized by persons familiar with this art, record card controlled machines having a great deal of flexibility for selectively associating and disassociating related record cards being advanced along a plurality of card feed paths, are known as collators. Such a record card controlled collator is described in U.S. Patent No. 2,359,670 which issued October 3, 1944, to R. E. Page, and is one which can perform a variety of operations as, for example, filing cards, removing cards from a file, matching related cards or related sets of cards and either refilling them or removing all of the related cards from the files, etc. The record card controlled collator to be described hereinafter is one which may also perform a great variety of card selecting, associating and disassociating operations. The subject collator, however, is a greatly improved machine over those known and available heretofore principally because the speed of record card handling has been increased many-fold. This has been brought about through the use of greatly improved and novel record card handling mechanism for transporting cards from their respective hoppers to select ones of a plurality of stackers, along with an electronic record card data handling and processing apparatus for governing the operation of the aforesaid mechanism.

Accordingly, a broad object of the present invention is to provide an improved record card controlled machine for selectively associating and disassociating related cards being advanced along a plurality of card feed paths.

Another object of this invention is to provide a record card collator having an improved card transport mechanism.

Briefly described, the subject collator in which the present invention is embodied is a cyclically operable machine comprising a primary record card feed unit and a secondary record card feed unit for advancing record cards in seriatim from respective card feed hoppers to associated card distributing mechanisms for effecting select stacker-pocket card distribution in accordance with the control data carried by the record card. These data are caused to be sensed by a pair of in-flight reading stations in each of the card feed units. Although these cards are moved in substantially one plane, they are also moved in a number of different forward and lateral directions. Thus, for example, a primary card is fed forwardly from its hopper to a so-called cornering station whereat the same is stopped briefly prior to being removed therefrom in a select one of two different directions. Furthermore, the said card is once again caused to be stopped at another cornering station from which the card is removed in a forward direction for advancement to a particular card stacker. The so-called merge cornering station whereat associated primary and secondary cards may be entered simultaneously, is comprised of a pair of ski jump mechanisms, one of which is inverted, for arranging the pair of simultaneously entered cards in a superposed relationship. Once these cards are fully entered into this merge cornering station, the superposed primary and secondary cards are advanced together therefrom in a forward direction toward the merged stacker.

In line with the foregoing, another object of this invention is to provide a record card transport mechanism having a cornering station into which a card is entered in a forward direction and from which the card is removed in a select one of two different directions.

A specific object of this invention is to provide selectively operable record card feed mechanisms for removing a card at rest from a cornering station in one of two lateral directions.

Another object of this invention is to provide a merge cornering station whereat record cards approaching one another in a single plane from opposite directions, are placed in a superposed relationship.

In line with the foregoing, another object of this invention is to provide mechanism for advancing superposed primary and secondary cards toward a merge stacker.

As will be described in detail hereinafter, a secondary record card may be removed in a lateral direction from a first card cornering station to either another cornering station or through this latter-mentioned station to a third cornering station. A secondary card merge capstan and match gate mechanism is associated with the so-called feed-through station, i.e., the aforesaid another cornering station, to selectively control the movement of a secondary card either to or through the feed-through station. Accordingly, another object of this invention is to provide selectively operable mechanism for either advancing a record card in its general direction of movement or stopping the card prior to its being moved in another direction.

Other objects of the invention will be pointed out in the description and claims and illustrated in the accompanying drawings, which disclose, by way of examples, the principle of the invention and the best mode, which has been contemplated, of applying that principle.

GENERAL DESCRIPTION

Figures 2, 3:
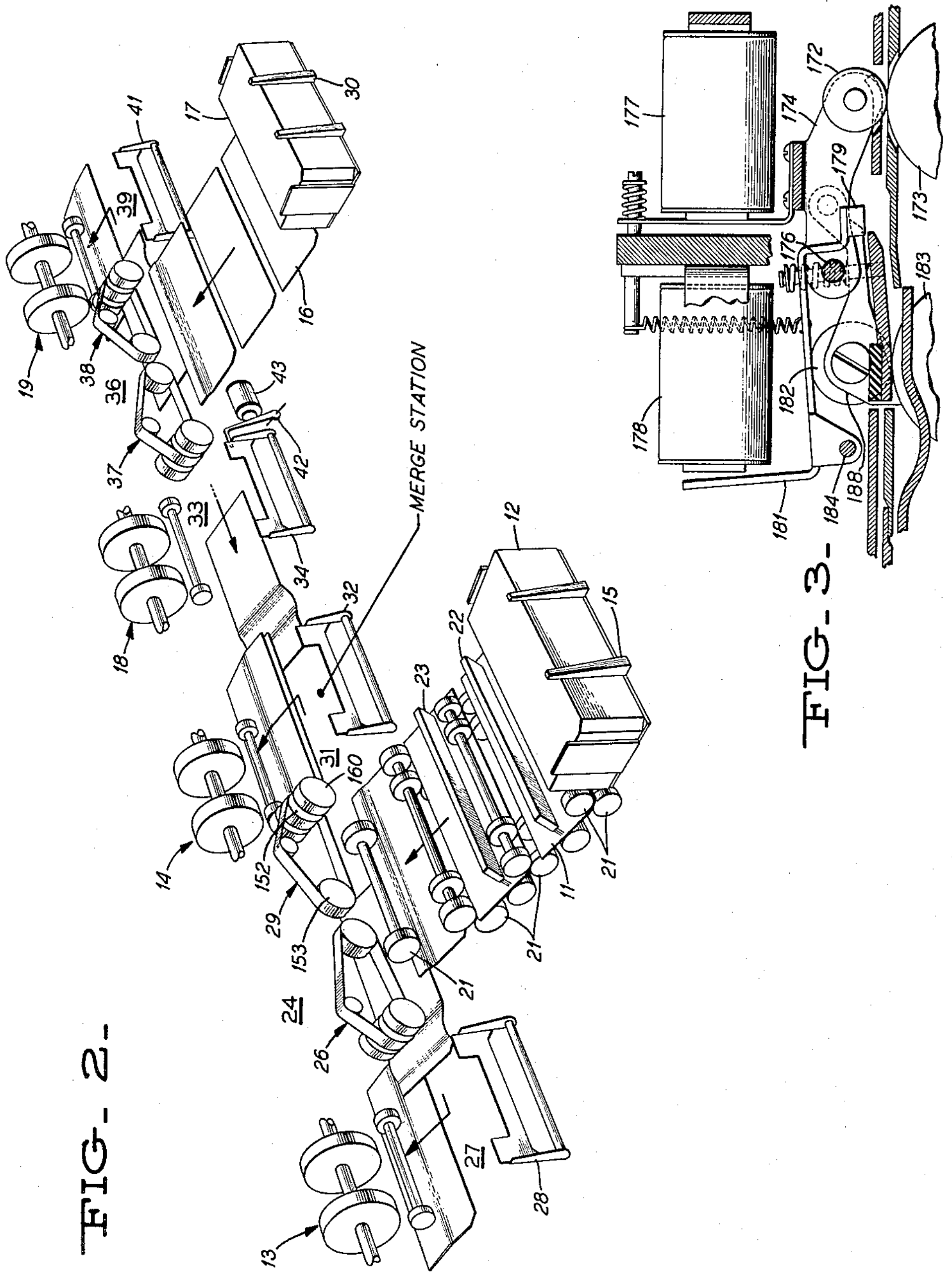
FIG. 2 is a diagrammatic perspective view of the collator record card transport mechanism.
FIG. 3 illustrates the secondary record card merge capstan and match gate mechanism.

*Primary and secondary record card feed paths.*—Referring to FIG. 2, primary cards 11, such as the well-known IBM record cards for example, are advanced in forward and lateral directions one-by-one from a primary hopper 15 for holding a batch of primary cards 12, to either a primary-select stacker 13 or a merge stacker 14. Similarly, secondary cards 16 are advanced successively in forward and lateral directions from their respective hopper 30 for holding a batch of secondary cards 17, to either the merge stacker 14, a secondary-select No. 1 stacker 18, or a secondary-select No. 2 stacker 19. Each of these afore-mentioned stackers is preferably a conventional drum-type record card stacker.

It might be well to mention here in order to avoid any confusion whatsoever that the stacker platforms (not shown) associated with respective ones of the stackers, extend generally over the record card transport mechanism shown in FIG. 2 to support the stacked primary and secondary cards.

Referring once again to the primary card feed path, the primary cards 11 are fed from their hopper supported batch 12 by the card feeding mechanism shown and described in the copending G. A. Luning et al. U.S. patent application, Serial No. 431,316, filed on May 21, 1954, now Patent No. 2,877,017, past an in-flight primary-sequence brush-type card reading station 22, another in-flight primary data brush-type card reading station 23, to a so-called card cornering station 24. As is evident by examining FIG. 2, the primary cards 11 advanced successively into primary cornering station 24 from a forward direction, are fed laterally therefrom in either one of two directions by a respective one of the selectively operable cornering station lateral card feed mechanisms 26 and 29. The primary card caused to be removed from cornering station 24 by the mechanism 26, for example, is fed into another card cornering station 27 whereat the card is then caused to remain at rest on a suitable card holding element until a cyclically operable card pusher 28 forcibly removes the said primary card from primary-select cornering station 27 into the bite of a pair of continuously operating feed rollers (not shown) for transmittal in a forward direction to stacker 13. On the other hand, if a primary card 11 is removed from the cornering station 24 by the operation of mechanism 29, this card is advanced laterally into a merge cornering station 31. As will be brought out hereinafter, this cornering station 31 has a pair of ski jump mechanisms thereat, one of which is inverted, for arranging primary and secondary record cards that are to be merged in a superposed relationship. The cards which are advanced to merge cornering station 31, are then moved out of this station in the forward direction by another cyclically operable card pusher 32 a sufficient amount to cause the cards to be engaged by a pair of continuously operating feed rollers (not shown) which are associated with the merge stacker 14.

Secondary cards 16 are advanced from their hopper supported batch 17 past a pair of in-flight secondary-sequence data reading station 20 (see also FIG. 1) and a secondary data reading station 25. The arrangement of these latter-mentioned record card data reading stations in the secondary card feed, is similar to the arrangement of the data reading stations 22 and 23 in the primary card feed. After a secondary card 16 has been moved in a forward direction beyond its secondary data reading station 25, it is advanced into a secondary cornering station 36 which is similar to the primary cornering station 24. That is, consequent upon the select operation of either one of the lateral card feed mechanisms 37—38, a secondary card is caused to be advanced laterally to a respective secondary-select No. 1 cornering station 33 or a secondary-select No. 2 cornering station 39. Should this secondary card be advanced to the cornering station 39, it will then be moved in a forward direction into the bite of a pair of continuously operating feed rollers (not shown) by the action of the cyclically operable card pusher 41 for further advancement to the secondary-select No. 2 stacker 19. On the other hand, should a secondary card 16 be advanced to the cornering station 33 consequent upon the operation of mechanism 37, this card may either be further advanced in a lateral direction to the afore-mentioned merge cornering station 31 or be moved in a forward direction by the normally disabled card pusher 34 into the direction of secondary-select No. 1 stacker 18. The selective operation of the secondary card merge capstan and match gate mechanism which is shown in FIG. 3, will be described in detail hereinafter. It can be stated briefly for present purposes, however, that the operation of this latter-mentioned mechanism is to selectively transport a secondary card to either merge cornering station 31 or secondary-select No. 1 stacker 18. The card pusher 34 is normally latched away from the secondary-select No. 1 card holding element (not shown) by an operating element 42. However, when a secondary card 16 is caused to stop at station 33 prior to being advanced in a forward direction to stacker 18, the electromagnet 43 is energized to unlatch pusher 34 for effective removal of the card.

*Collator circuit description.*—Prior to describing the operation of the various apparatuses shown in FIG. 1, a brief description of these apparatuses will be given.

*Record card data storage device.*—Each of the storage devices 51–54 (FIG. 1) is comprised of a saturable magnetic core matrix which, in turn, is defined by a plurality of cores 103 (FIG. 6) that are arranged along columns 101 and rows 102 in the general manner of the core matrix arrangement shown and described in the Weidenhammer Patent No. 2,798,267 which issued on May 10, 1955. The core devices per se are of the so-called non-destructible readout (NDRO) variety disclosed and claimed in the copending Brown U.S. patent application, Serial No. 383,568, which was filed on October 1, 1953, now Patent No. 2,902,676. Each of the core devices includes a write winding 104, a read-reset winding 106, and a sample winding 107. Furthermore, each of the core columns 101 is associated with a respective one of a select field (as determined by control panel wiring) of record card columns. On the other hand, each of the core rows 102 is representative of a 1—2—4—8 binary notation denominational order. Since data are decorded in the primary and the secondary cards 11 (see also FIG. 2) and 16, respectively, in a decimal notation, each of the storage devices 51–54 includes decimal-to-binary coding cams 108–111 (FIG. 6) for effectively translating the record card decimal data to storage device binary data.

As is brought out in the afore-mentioned copending Brown patent application, the information caused to be stored in a NDRO core device is not lost during the readout thereof because of the very nature of these devices. Accordingly, it is necessary to provide the storage device reset apparatuses 56–59 (see also FIG. 1), whereby each of the respectively associated storage devices 51–54 can be selectively reset. Thus, for example, the primary storage device 52 is reset selectively through the action of apparatus 57 via the electrical connection designated by the reference numeral 112 (see FIG. 6).

*Storage device readout pulser circuit.*—The information to be stored in a core matrix storage device 51–54 (FIG. 1), is caused to be entered therein from the record card in a serial-by-bit, parallel-by-column fashion. Accordingly, if each of the storage devices 51–54 is comprised of sixteen core columns 101 (FIG. 6), sixteen record card columns of information can be applied thereto in parallel as the record card is sensed while in flight past its respective data reading station. The stored information in accordance with the data applied to the write windings 104, is read out of each of the storage devices 51–54 (FIG. 1) in a parallel-by-bit, serial-by-column fashion. Accordingly, in response to each sample test pulse applied via lines 113–114 (see also FIG. 6) to storage device 51, for example, those binary notation bits of information represented within a core column 101, are transmitted in parallel from the said storage device to the primary-primary sequence data compare apparatus 61 via electrical connection 121.

Figure 6:
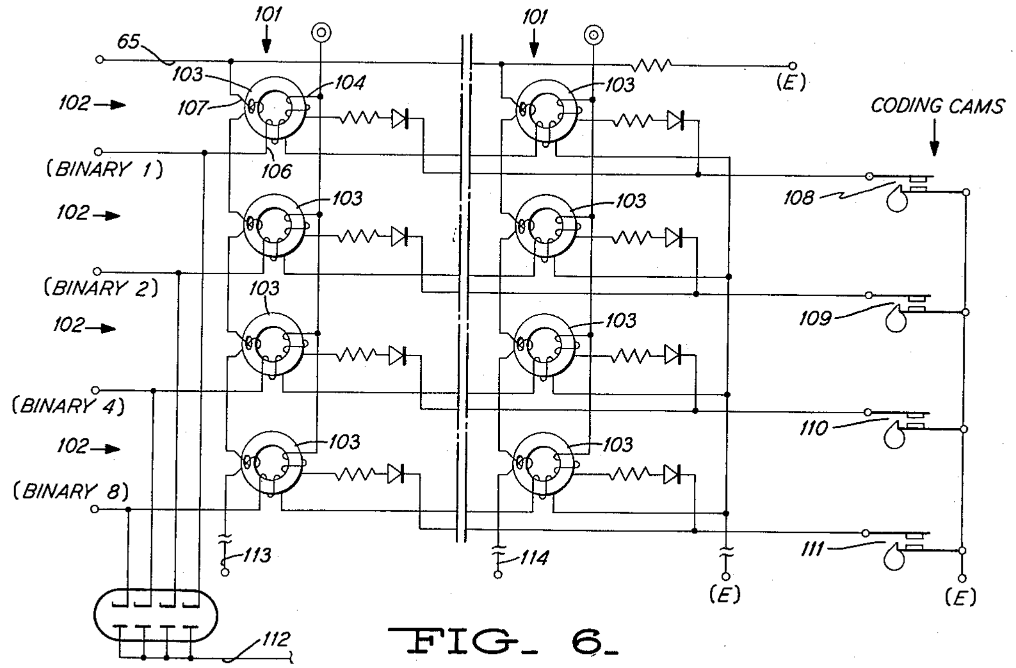
FIG. 6 illustrates the arrangement of apparatus within each core matrix storage device.

The storage readout pulser circuit may be best described as a timer ring having as many output stages as there are storage device core columns. Thus, it should be clear that in the preferred and illustrative embodiment the readout pulser circuit 64 (FIG. 1) will have sixteen individual output stages, one for each of the sixteen core columns 101 (FIG. 6). These output stages are each connected to the series circuit connected sample windings 107 of a respective core column 101. Thus, as the pulser circuit advances from one stage to the next at 150 microsecond intervals, a suitable signal is applied to a succeeding core column group of sample windings, to thereupon effect the afore-stated 1—2—4—8 binary notation parallel-by-bit, serial-by-column readout from the core matrix storage along electrical connection 121.

*Data compare apparatus.*—There are three such apparatuses 61–63 (FIG. 1) for respectively providing a primary-primary sequence, primary-secondary, and secondary-secondary sequence data comparison; i.e., for providing a high, low or equal relative magnitude result. Referring to the block diagram shown in FIG. 7 of a portion of the primary-secondary data compare unit 62 (see also FIG. 1), the 1—2—4—8 binary notation parallel-by-bit input lines 116–119 (represented in FIG. 1 by reference numeral 120) are connected to the output of primary data storage device 52 as depicted by the connection 120. The signals applied to the lines 116–119 (FIG. 7) are suitably shaped and amplified by their respective devices 122 prior to being applied to one input side of their respectively associated AND gates 123. These AND gates are conditioned for conduction successively, high denominational order first, by the operation of a fast timer ring 66 (see also FIG. 1) to be described shortly. Thus, the binary 8-bit line 119 is gated first, then the binary 4-bit line 118, the binary 2-bit line 117, and finally the binary 1-bit line 116. Any signals caused to appear at any of the output sides of the AND gates 123, are transmitted to one input side of each of the AND gates 124—125 via the circuit OR "O" and cathode follower "CF" elements 128 and 129. The secondary record card data are applied to the other input side of each of the AND gates 124 and 126 from the output side of secondary storage device 54 (see also FIG. 1) as depicted by connection 131. Thus, if matched primary and secondary data signals are applied to the input of AND gate 124, i.e., these data are equal, the inverter "I" and cathode follower "CF" circuit elements 132 and 133 will render the AND gates 125 and 126 nonconductive. Accordingly, neither the low primary or high secondary relay 71 (see also FIG. 1) nor the high primary relay 73 will be energized to indicate a relative magnitude wherein the primary data are neither low nor high. Thereupon, the equal relay 72 will be operated between 240°–258° (see also FIG. 5) when cam contacts C1 make to indicate that the primary and secondary data are matched.

On the other hand, should a primary data signal applied to AND gate 124 be high with respect to the coincidentally timed secondary data signal applied to the other input thereof, all three of the input signals to AND gate 125 wil be positive simultaneously. Hence, this will cause the operation of the high primary relay 73 via the cathode follower "CF" and thyratron "THY" circuit elements 136—137. The operation of this latter-mentioned relay causes the circuit between cam contacts C1 and equal relay 72 to be ineffective during 240°–258° by switching means included within circuit elements 136—137.

Finally, should the secondary data signal to AND gate 124 be high with respect to the coincidently timed primary data signal, the AND gate 126 will conduct to effect the energization of low primary relay 71 via the circuit elements 138 and 139. The operation of this latter-mentioned relay will also open the circuit between cam contacts C1 and equal relay 72 during the make time of these contacts.

In summation, the binary notation primary and secondary data signals are applied to the input side of AND gate 124 serially-by-bit, serially-by-column, and high order first. Consequent upon a high primary data signal, the relay 73 is operated, whereas in response to a high secondary data signal, the low primary relay 71 is energized. The operation of either of these latter two mentioned relays causes the circuit between cam contacts C1 and equal relative magnitude relay 72 to be open during 240°–258° when the cam contacts are closed. Consequent upon the primary and secondary data signals applied concurrently to the input side of AND gate 124 being equal, neither of the relays 71 nor 73 is operated. Thereupon, the circuit between cam contacts C1 and equal relay 72 is maintained closed to permit the operation of this relay when the cam contacts close.

Figure 7:
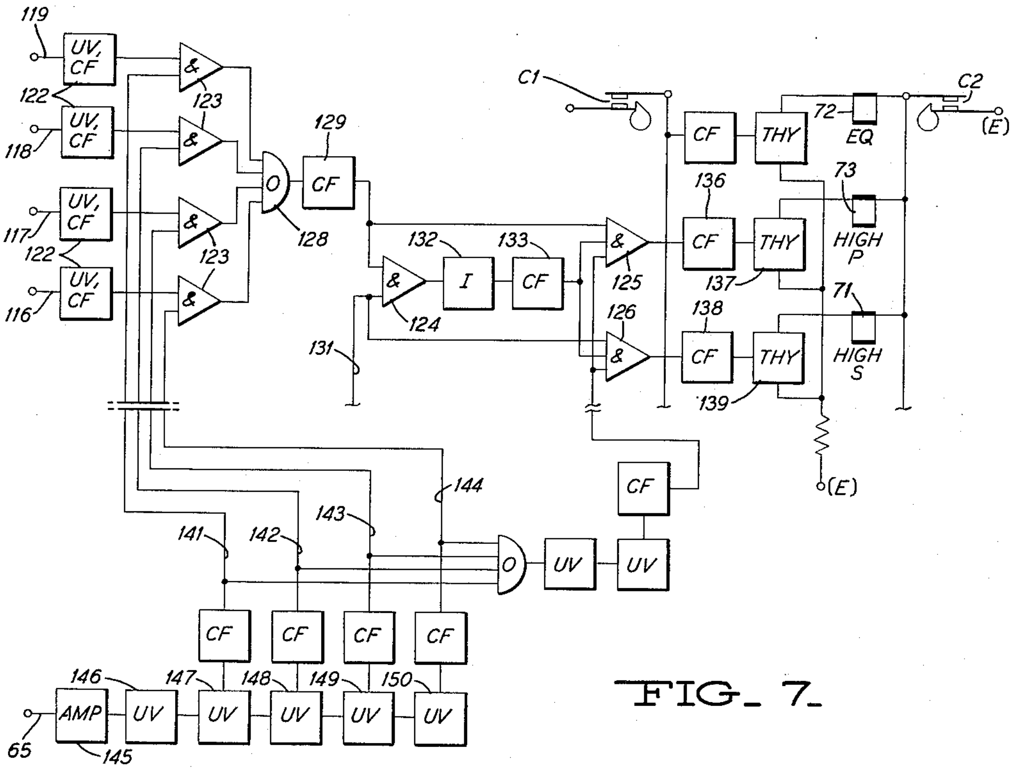
FIG. 7 illustrates the general arrangement of apparatus within a data compare unit in combination with components of the fast timer ring for gating serial-by-bit, serial-by-column data signals through the compare unit.

*Fast timer ring.*—The fast timer ring 66 (FIG. 1) is shown in block diagram form in FIG. 7 to be comprised of four output stages 141–144 each of which is connected to a respective AND gate 123. Thus, it should be clear that these AND gates which as stated previously are conditioned for conduction successively high order first, are so conditioned in a timed relation with the operation of the timer ring. It can also be seen in FIG. 7 that each of the afore-mentioned timer ring output stages is operatively connected to the input sides of each of the AND gates 125 and 126 in order that any unmatched binary notation bit signal may be passed through either of these gates.

The timer ring 66 is caused to begin its cyclic operation as a result of a signal applied thereto from the storage readout pulser circuit 64 (see also FIG. 1) via line 65. This signal is applied to the fast timer ring 66 whenever a succeeding one of the sixteen output stages of pulser circuit 64 is excited. The amplifier 145 excites a single-shot multivibrator "UV" 146 which twelve microseconds later excites a twenty microsecond "UV" 147. Each of the following "UV" devices 148–150 is effective for twenty microseconds. The devices 122 each include a cathode follower "CF" and a "UV" device that is excited for one hundred ten microseconds.

Figure 5:
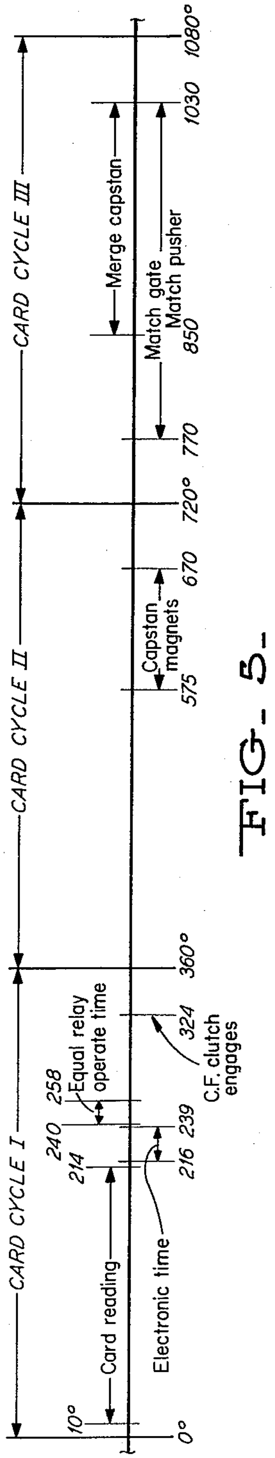
FIG. 5 is a timing diagram .

*Collator circuit operation.*—As stated previously in connection with FIG. 2, the primary record cards 11 are advanced one-by-one past their respective card data reading stations 22 and 23 to one of the drum-type stackers 13 and 14. The secondary cards 16 are advanced in seriatim past their respective card data reading stations 20 and 25 to one of the three stackers 14, 18 and 19. As these primary and secondary cards are moved past their respective card data reading stations, certain select data in accordance with the control panel wiring, are entered into saturable core matrix data storage devices 51–54 (FIG. 1). Referring to FIG. 5, these data are read from the cards during 10°–214° of a card feed cycle, for example cycle I. At 216° of the same card feed cycle, the storage readout pulser circuit 64 (see also FIG. 1) is caused to operate so as to effect the afore-mentioned parallel-by-bit, serial-by-column, i.e., core column data readout, from each of the devices 51–54. The operation of the pulser circuit 64 with regard to the devices 51–54 continues until 239°, by which time all of the data stored in these storage devices has been read out into respective data comparing units 61–63. Furthermore, during this period of the card feed cycle, i.e., the electronic time period 216°–239°, any low or high relative magnitude data relays that are to be energized as a result of unmatched data, are actually energized. Should, however, the data which are applied to the data comparing units 61–63 be equal, the cam contacts C1 (see also FIG. 7) will be effective during 240°–258° (see also FIG. 5) to energize the equal relay associated with the particular data compare unit emitting an equal output signal.

As is well recognized by persons familiar with the record card collator art, the selective operation of one or more of the low, equal and high relative magnitude relays governs the card handling operation performed by the record card transport mechanism. Thus, in a manner similar to that brought out in the afore-mentioned Page patent, the record card handling mechanism is governed by the record card data in a manner commensurate with the control panel wiring. The control panel apparatus including suitable and conventional switching circuits, delay devices, etc., for use with the present record card collator is depicted in FIG. 1 by the block 79 having an input 84 and an output 86. Thus, the primary-primary sequence, primary-secondary, and secondary-secondary sequence relative magnitude data comparison results as provided at outputs 81–83, respectively, are applied to the control panel apparatus input 84. The control panel apparatus output 86 could be operatively connected to the various following devices:

(1) Primary card feed clutch 87 to govern the feeding of primary cards 11 from their hopper 15. The clutch "decision" time is 258° (see also FIG. 5), whereas its engaging time is 324°.

(2) Secondary card feed clutch 88 to govern in a similar fashion the feeding of secondary cards 16 from their hopper 30.

(3) Lateral card feed mechanism magnets 91—92 and 94—95 to laterally remove a card at rest in the cornering stations 24 and 36, respectively. These magnets may be energized during the period 215°–310°.

(4) Secondary card merge capstan and match gate magnets represented by the reference numeral 93 to permit a secondary card 16 to be moved laterally from secondary cornering station 36 to either merge cornering station 31 or secondary-select No. 1 cornering station 33. The merge capstan magnet may be energized between 130°–300°, whereas the gate magnet may be energized from 50°–310°.

(5) Magnet 43 for maintaining the pusher 34 (see also FIG. 2) latched when a secondary card is advanced to merge cornering station 31, and for releasing or unlatching the pusher for operation in a forward direction when a secondary card is stopped in station 33. This magnet may be energized from 50°–310°.

(6) Data restore devices 56–59 for resetting their respective storage devices 51–54.

RECORD CARD TRANSPORT MECHANISM

*Cornering station lateral record card feed mechanism.*—It has already been brought out that when a primary card 11 (FIG. 2) and/or a secondary card 16 is moved into a respective cornering station 24 and 36, the lateral card feed mechanisms 26, 29, 37 and 38 are selectively operated to further advance these cards in the general direction of one of the select stackers 13, 18 and 19, or the merge stacker 14. Inasmuch as each of these aforementioned lateral card feed mechanisms is similar in construction and operation, only the mechanism 29 will be described in detail.

Figure 4:
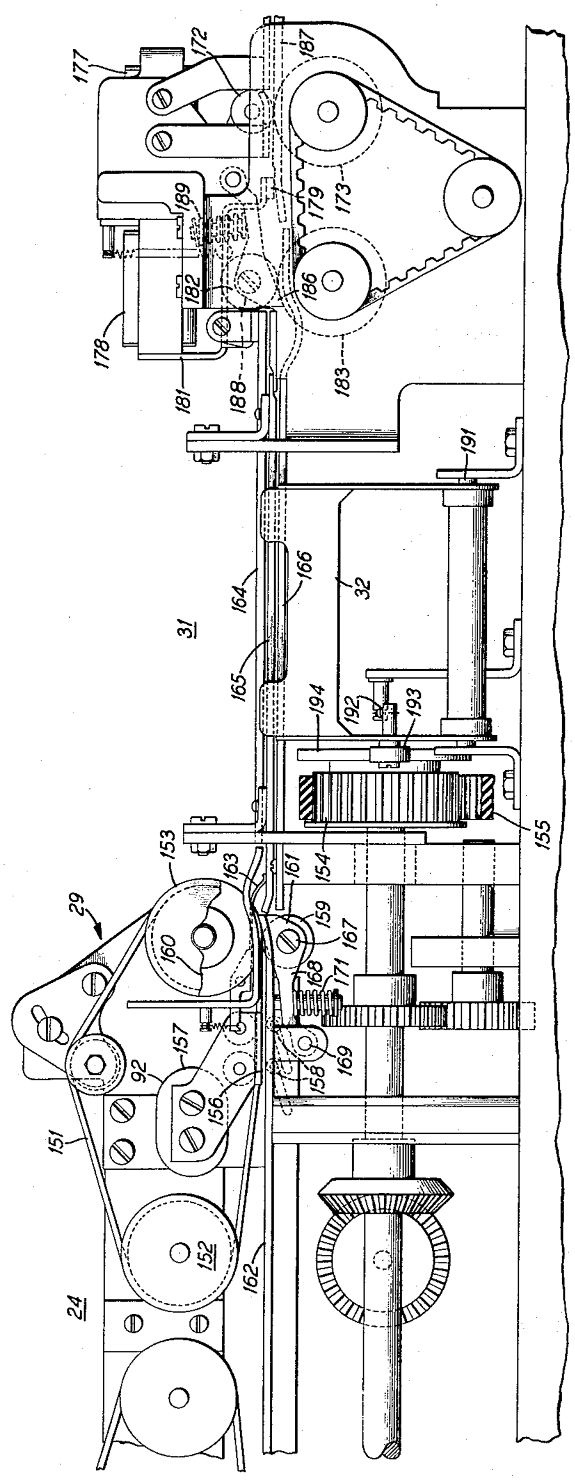
FIG. 4 illustrates a detailed section of the record card transport mechanism.

Referring to FIGS. 2 and 4, this mechanism is shown to include a continuously moving endless belt which is supported and driven in a counterclockwise direction by a continuously rotating roller 152 thus driving roller 153. The roller 152 is operatively connected by conventional means (not shown) to the drive timing belt pulley 154 which, in turn, is driven by the main drive timing belt 155. As is shown in FIG. 4, the endless belt 151 is caused to move between the pole faces 156 of a normally de-energized electromagnet 157. That is, these pole faces are spaced a distance equal to the belt width. Directly opposite the spacing defined by faces 156 and the outer side of belt 151, there are located two pivotally mounted rollers 158 which are spring-biased away from the said face so that the continuously moving endless belt 151 does not ordinarily engage these rollers 158. It should be clear that these rollers 158 need not be spring-biased so long as they are arranged to move away from the belt by the gravitational force. Consequent upon the energization of electromagnet 157, however, a magnetic field appears between the faces 156 to attract the metallic rollers 158 thereto. This field is of sufficient magnitude to overcome the spring-bias applied to these rollers, so that these rollers are moved about their pivot points in the direction of face 156, and, of course, the outer face of belt 151.

When the primary card 11 (see FIG. 2) is advanced into the primary cornering station 24 (see also FIG. 4), an end portion of the card lies below belt 151 between face 156 and rollers 158. So long as electromagnet 157 is not energized, the rollers 158 are, as stated previously, biased away from face 156 to preclude a lateral card movement of the primary card from the cornering station

24. In response to the energization of magnet 157, however, the rollers 158 will be moved about their pivot points toward face 156 as stated previously so as to clamp the card against the outer face of continuously moving belt 151. Hence, the card will be moved laterally by its conveyor, i.e., belt 151, from the cornering station into the bite provided by continuously rotating feed rollers 153 and 159. These latter-mentioned feed rollers will be effective to advance the primary card laterally into the merge cornering station 31 opposite cyclically operable pusher 32. Immediately upon the de-energization of magnet 157, the feed rollers 158 will be moved to their home position away from face 156 due to the aforementioned spring-biasing action applied thereto.

As stated previously, each of the cornering station lateral card feed mechanisms 26 (FIG. 2) 37 and 39 is constructed in a similar manner to that just described for mechanism 29. It should be celar that the card conveying belts associated with mechanisms 29 and 38 move in a counterclockwise direction, whereas the belts within mechanisms 26 and 37 move in a clockwise direction. Thus, the cards will be removed in one of two lateral directions from both of the cornering stations 24 and 36 in accordance with the selective operation of the mechanism electromagnets 91—92 (see also FIG. 1) and 94—95.

*Auto-compensating ski jump mechanism.*—As just described, a primary card 11 is moved laterally from primary cornering station 24 (FIG. 4) due, in part, to the operation of continuously rotating feed rollers 159—160. As may be seen in FIG. 4, a card so moved into merge cornering station 31 is caused to pass over the upturned end 161 of a pivotally movable arm 168. The arrangement of the rollers 169 and this upturned end 161 is such that the outer surface of roller 160 moves freely of the upper surface of end 161. The distance between the outer surface of roller 160 and the upper surface of end 161 is less than the thickness of a record card. Accordingly, a record card which is moved into this space will be engaged by the continuously moving roller 160. Thus, when the trailing edge of the laterally fed card is moved beyond the bite provided by feed rollers 159—160, the card is caused to be positively moved beyond the upturned end 161, i.e., the ski jump, by the action of the roller 160 thereon. As may be seen in FIG. 4, this card is advanced underneath a spring finger 163 and into a slot-like chamber which is defined by the superposed plates 164 and 165. The plate 165 is the primary card holding element for supporting the same at rest.

The feed roller 159 is freely mounted on a stud 167 which, in turn, is supported by the pivotally movable arm 168. This arm is biased about its pivot point 169 by a spring 171 in the direction of the roller 160. It should be clear from the arrangement shown that even though the roller 160 may be reduced considerably in diameter due to wear, the same will be maintained in engaging contact with the outer surface of roller 159. Furthermore, it should be clear that the spacing distance between roller 160 and upturned end 161 will remain substantially constant. Accordingly, it should be clear that the ski jump mechanism is automatically self-compensating.

Figure 1:
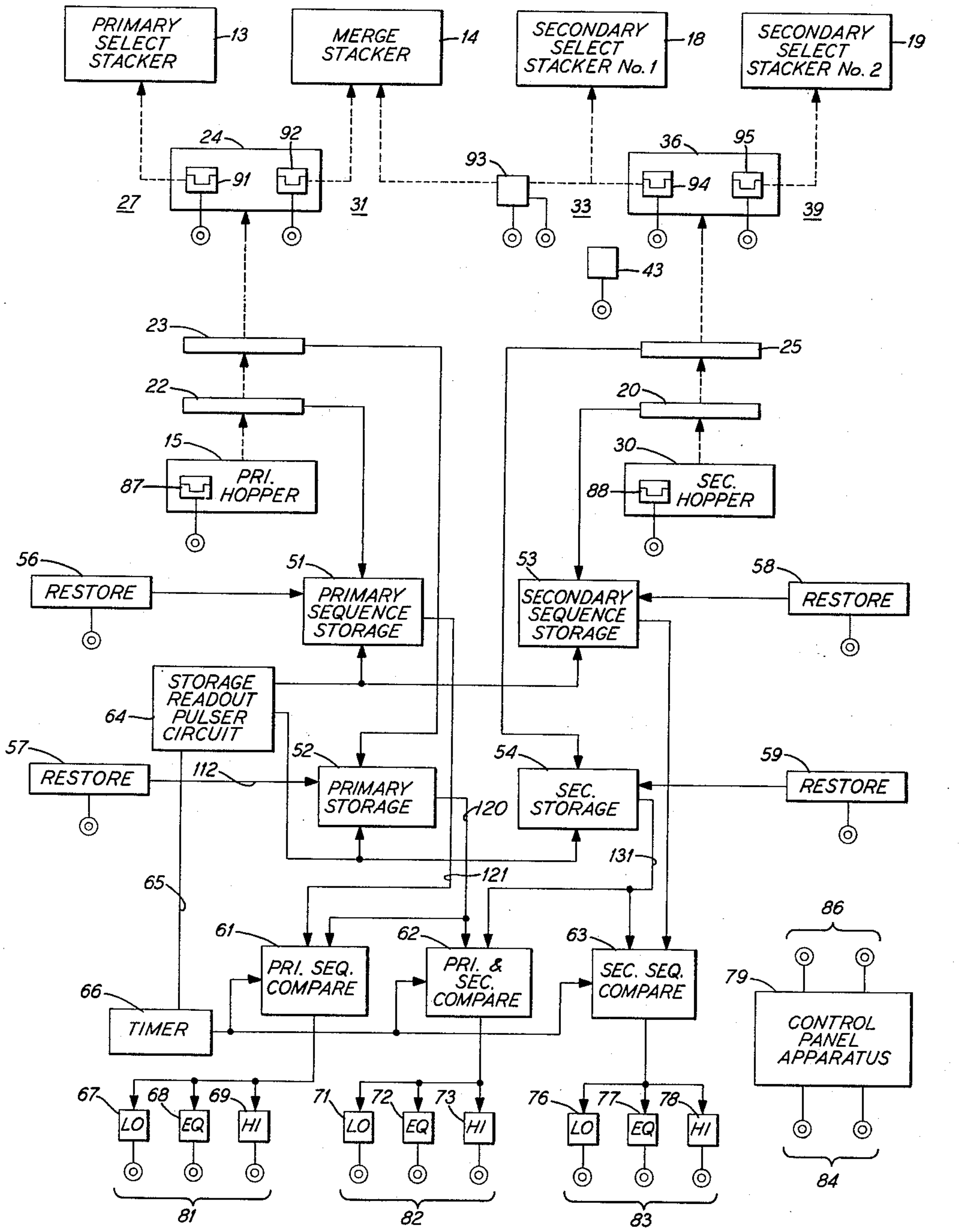
FIG. 1 is a block diagram of the collator circuit.

*Secondary card merge capstan and match gate mechanism.*—As stated previously in connection with FIGS. 1 and 2, a secondary card 16 may be fed laterally through secondary select No. 1 cornering station 33 to merge cornering station 31, or it may be stopped at the cornering station 33 for advancement in a forward direction to stacker 18. The mechanism for affording this selective card handling operation is illustrated in FIG. 3. Referring thereto, when the lateral card feed mechanism electromagnet 94 (see also FIG. 1) is operated to move a secondary card from secondary cornering station 36 to station 33, the leading edge of this card is moved in the direction of feed rollers 172 and 173. The idler roller 172 is mounted on a pivotal arm 174 which is caused to move about its pivot point 176 as merge capstan magnet 177 is energized and de-energized. Hence, whenever this magnet is energized, the roller 172 is moved into engagement with continuously driven roller 173.

The so-called match gate mechanism is shown in FIG. 3 to be operated by a magnet 178. So long as this magnet is de-energized, the card gate 179 which is an integral part of the pivotally mounted armature 181, is maintained above the secondary card feed line. Accordingly, when magnet 177 is energized and magnet 178 is de-energized, a secondary card can be advanced by feed rollers 172—173 past the raised gate 179 and into the bite of continuously rotating rollers 182—183. Whenever magnet 178 is energized, its armature 181 is attracted thereto and the gate 179 is moved about pivot point 184 into the secondary card feed path. Accordingly, the lateral advancement of a secondary card from cornering station 36 (see also FIG. 1) in the direction of station 33, will be stopped by the gate 179 now located in the card feed path. It might be well to mention here that whenever magnet 178 is energized, magnet 177 is de-energized in order that roller 172 be moved out of engagement with driving roller 173.

As indicated previously, whenever a secondary card is stopped in station 33, the pusher 34 (see also FIG. 2) latching mechanism which is controlled by magnet 43, is released to move the secondary card into the bite of a first set of feed rolls for advancing the same toward stacker 18. Thus, it may be stated in summation that whenever a secondary card is to be moved from cornering station 36 to station 31, merge capstan magnet 177 (FIG. 3) is energized and match gate magnet 178 along with the pusher control magnet 43 are de-energized. If the secondary card is to be moved simply from station 36 to station 33, magnet 177 is de-energized to disengage roller 172—173, whereas magnets 178 and 43 are each energized to block the card feed path with gate 179 as well as to push the card stopped by the gate from station 33 toward stacker 18.

*Primary and secondary card merge station.*—Those primary and secondary cards 11 (FIG. 2) and 16, respectively, that are to be merged in stacker 14, are advanced to merge cornering station 31. As described previously in connection with FIG. 4, the primary cards are each advanced by the lateral card feed mechanism 29 and the auto-compensating ski jump mechanism into a slot-like chamber defined by the spacing of plates 164—165. A secondary card may be advanced similarly into the merge cornering station 31 either with or without a primary card being advanced into the same station simultaneously. Referring to FIG. 4, a secondary card is advanced into a slot-like chamber defined by plates 165—166 within cornering station 31, by the afore-described secondary card merge capstan mechanism and a secondary ski jump mechanism. That is, with the simultaneous energization of magnet 177 and de-energization of magnet 178, the secondary card will be advanced by feed rollers 172—173 into the bite of feed rollers 182—183. These latter-mentioned rollers in cooperation with the downwardly curved end 186 (similar to upturned end 161) of pivoting arm 188, provide the same card feeding action with respect to a secondary card as do the feed rollers 153, 159 and upturned end 161 with respect to a primary card. That is, the roller 183 is spaced from the opposing surface of the end 186 a distance less than the thickness of a secondary card. Accordingly, when the trailing edge of such a card is moved beyond the bite provided by rollers 182—183, the card is clamped to roller 183 and thereupon fully moved into the cornering station 31 over the ski jump curved end 186. The ski jump mechanism associated with the secondary card feed is also a self-compensating one in that the roller 182 is mounted on the pivoting arm 188 which is biased by spring 189 in the direction of roller 183. Hence, even though roller 182 may be reduced in size due to wear, the said roller will nevertheless be maintained in engagement with roller 183.

The merge station pusher 32 (see also FIG. 2) is freely mounted on an axle shaft 191 and is biased in the direction of cornering station 31 by a spring 192. A cam follower roller 193 which is mounted on a support rigidly connected to pusher 32, is maintained in constant engagement with a continuously rotating cam 194 by the action of biasing spring 192. As is shown in FIG. 4, the cam 194 is attached to the main driving timing pulley 154. The operation of this mechanism is such as to cause the pusher 32 to be moved cyclically toward and away from cornering station 31. Accordingly, whether there be a single primary card in the chamber defined by space plates 164—165, or a single secondary card in the chamber defined by space plates 165—166, or whether said chambers each have a card therein at the same time, the pusher 32 will be effective after the cards have been completely moved into cornering station 31, to move the same toward the continuously operating feed rollers for advancing the cards into merged stacker 14. It is to be noted that if there are both a primary and a secondary card in cornering station 31, these cards are advanced simultaneously from the cornering station into the aforesaid feed rollers for movement into stacker 14 while the said cards are, and remain, in a superposed relationship.

SUMMARY

As described in connection with FIGS. 1 and 2 particularly, the present invention relates to a high speed record card controlled collator having electronic data handling and processing apparatus. These data are read from the primary and secondary record cards which are transported selectively in forward and lateral directions into one of a plurality of stackers in accordance with the primary-primary sequence, primary-secondary, and secondary-secondary sequence relative magnitude data comparison results. As is shown in FIG. 1, the subject collator is comprised of six aligned record card cornering stations 24, 27, 31, 33, 36 and 39. There are four drum-type stackers 13, 14, 18 and 19 forwardly displaced of four of the aforesaid six cornering stations; namely, primary select station 27, merge station 31, secondary select No. 1 station 33 and secondary select No. 2 station 39. There also provided card feeding means under control of the clutches 87—88 to advance respective primary and secondary record cards in a forward direction to the other two of the aforesaid six cornering stations, i.e., primary and secondary stations 24 and 36. Each of these latter-mentioned cornering stations includes a pair of normally disabled record card feed operating mechanisms for removing record cards at rest thereat in different lateral directions when operated. Hence, a primary card moved into primary cornering station 24 from a forward direction may be removed therefrom selectively to either primary select station 27 or merge station 31. Similarly, a secondary card which has been moved into secondary cornering station 36 from a forward direction, may be removed therefrom laterally to a select one of the stations 31, 33 or 39. Of course, each of the cornering stations directly associated with one of the four stackers, has a pusher mechanism thereat for removing record cards at rest within these stations, in a forward direction.

The lateral card transport mechanism whereat the afore-mentioned six cornering stations are arranged in alignment, includes a pair of spaced superposed record card holding elements within merge station 31 for supporting respective primary and secondary cards at rest. The arrangement of these elements with respect to ski jump mechanism for advancing cards thereto, is such as to permit primary and secondary cards to be advanced into merge station 31 simultaneously and from opposite lateral directions. The aforesaid card transport mechanism also includes a merge capstan and match gate mechanism which is controlled by the apparatus identified by the reference numeral 93. The operation of this latter-mentioned mechanism causes a secondary card to be selectively moved from secondary cornering station 36 to either merge or secondary select No. 1 cornering stations 31 and 33, respectively.

Thus, in keeping with the general operation of the subject record card controlled collator, primary and secondary cards may be selectively associated and disassociated by the select feeding thereof in forward and lateral directions from their respective card hoppers to certain ones of the card stackers. While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A record card collator comprising, a record card transport mechanism including a plurality of record card stations each having a holding element for supporting a record card at rest, a corresponding plurality of record card stackers, a pair of record card cornering stations arranged within said transport mechanism, each of said stations including a pair of normally disabled record card feeding operating means for moving record cards at rest thereat in different directions when operated, record card data sensing means, feed means for feeding record data cards past said sensing means into said stations, data comparing means operated from the sensing means, and means controlled by the comparing means for selectively operating the normally disabled feeding means to remove cards from said stations in different directions.

2. A record card collator for handling primary and secondary record cards comprising, a pair of record card stations the first of which includes a holding element for supporting a secondary record card at rest and the second of which includes a pair of spaced superposed primary and secondary record card holding elements for supporting respective record cards at rest; primary record card data reading means; secondary record card data reading means; means for advancing primary record cards in seriatim past the primary record card reading means and onto one of the second record card station holding elements from one lateral direction; other means for advancing secondary cards in seriatim past said secondary record card data reading means and said first station onto the other of the second station holding elements from another direction, data comparing means; electrical means operatively connecting said primary and secondary data reading means to said data comparing means; and means controlled by the comparing means for selectively controlling feeding of secondary cards to the first and second card stations.

3. A record card collator as in claim 2 additionally comprising cyclically operable means to remove primary and secondary record cards from their respective second record card station holding elements in a forward direction.

References Cited in the file of this patent

UNITED STATES PATENTS

| | | |
|---|---|---|
| 707,787 | Marresford | Aug. 26, 1902 |
| 2,355,079 | Jones | Aug. 8, 1944 |
| 2,359,670 | Page | Oct. 3, 1944 |
| 2,364,202 | Ford | Dec. 5, 1944 |
| 2,499,439 | Winters | Mar. 7, 1950 |